United States Patent
Mahan

(10) Patent No.: US 8,616,854 B2
(45) Date of Patent: Dec. 31, 2013

(54) NOSE CONE ASSEMBLY

(75) Inventor: Vance A. Mahan, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 628 days.

(21) Appl. No.: 12/398,439

(22) Filed: Mar. 5, 2009

(65) Prior Publication Data

US 2010/0226786 A1    Sep. 9, 2010

(51) Int. Cl.
*F01D 5/00*    (2006.01)

(52) U.S. Cl.
USPC ....................................... 416/245 R

(58) Field of Classification Search
USPC ....................................... 416/245 R
See application file for complete search history.

(56) References Cited

U.S. PATENT DOCUMENTS

| | | | |
|---|---|---|---|
| 1,730,742 A | 10/1929 | Nelson | |
| 1,773,319 A | 8/1930 | Rauen | |
| 2,297,226 A | 9/1942 | Muller-Keuth et al. | |
| 2,336,256 A * | 12/1943 | Junger | 416/245 R |
| 2,371,801 A | 3/1945 | Chester et al. | |
| 2,394,749 A | 2/1946 | Chester et al. | |
| 2,401,247 A | 5/1946 | Hunter | |
| 3,799,693 A | 3/1974 | Hull | |
| 3,990,814 A | 11/1976 | Leone | |
| 4,393,650 A * | 7/1983 | Pool | 60/39.093 |
| 4,405,285 A | 9/1983 | Surdi | |
| 4,863,354 A * | 9/1989 | Asselin et al. | 416/245 R |
| 5,149,251 A | 9/1992 | Scanlon et al. | |
| 5,573,378 A | 11/1996 | Barcza | |
| 6,447,255 B1 | 9/2002 | Bagnall et al. | |
| 6,561,763 B2 | 5/2003 | Breakwell | |
| 6,942,462 B2 | 9/2005 | Breakwell et al. | |

FOREIGN PATENT DOCUMENTS

| | | |
|---|---|---|
| EP | 0294654 | 12/1988 |
| EP | 0850831 | 7/1998 |
| GB | 451553 | 8/1936 |
| GB | 2363170 | 12/2001 |
| GB | 2364748 | 6/2002 |
| JP | 2001-065366 | 3/2001 |

* cited by examiner

*Primary Examiner* — Zandra Smith
*Assistant Examiner* — Jamie C Niesz
(74) *Attorney, Agent, or Firm* — Krieg DeVault, LLP

(57) ABSTRACT

A nose cone assembly for a gas turbine engine is disclosed herein. The nose cone assembly includes a spinner body having an outer surface and extending axially between an upstream portion generally tapering to a truncated first end and a base portion generally cylindrical in cross-section at a second end. The nose cone assembly also includes a flange positioned radially inward of the outer surface and axially adjacent to the base portion. The nose cone assembly also includes a plurality of first apertures defined in the flange for removably connecting the spinner body to a fan of a gas turbine engine. The nose cone assembly also includes a second aperture defined in the spinner body through which all of the plurality of first apertures can be accessed for attaching or removing the nose cone assembly from the fan.

15 Claims, 5 Drawing Sheets

NOSE CONE ASSEMBLY

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of F33615-03-D-2357 awarded by the Department of Defense.

BACKGROUND OF THE INVENTION

1. Field of the Invention

The present invention relates to turbine engines and more particularly to nose cone assemblies that can be a component of turbine engines.

2. Description of Related Prior Art

A nose cone assembly can be a component of a turbine engine. The nose cone assembly can include a spinner body that is attached to and rotates with a hub at the radial center of the inlet of the turbine engine. The hub generally carries one or more stages of blades extending radially outward. The blades can be fan blades or compressor blades. The nose cone assembly provides an aerodynamic surface covering the upstream end of the rotor hub and directs the inlet airflow into the hub region of the blades.

SUMMARY OF THE INVENTION

In summary, the invention is a nose cone assembly for a gas turbine engine. The nose cone assembly includes a spinner body having an outer surface and extending axially between an upstream portion generally tapering to a truncated first end and a base portion generally cylindrical in cross-section at a second end. The nose cone assembly also includes a flange positioned radially inward of the outer surface and axially adjacent to the base portion. The nose cone assembly also includes a plurality of first apertures defined in the flange for removably connecting the spinner body to a fan of a gas turbine engine. The nose cone assembly also includes a second aperture defined in the spinner body through which all of the plurality of first apertures can be accessed for attaching or removing the nose cone assembly from the fan.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

Figure 1:
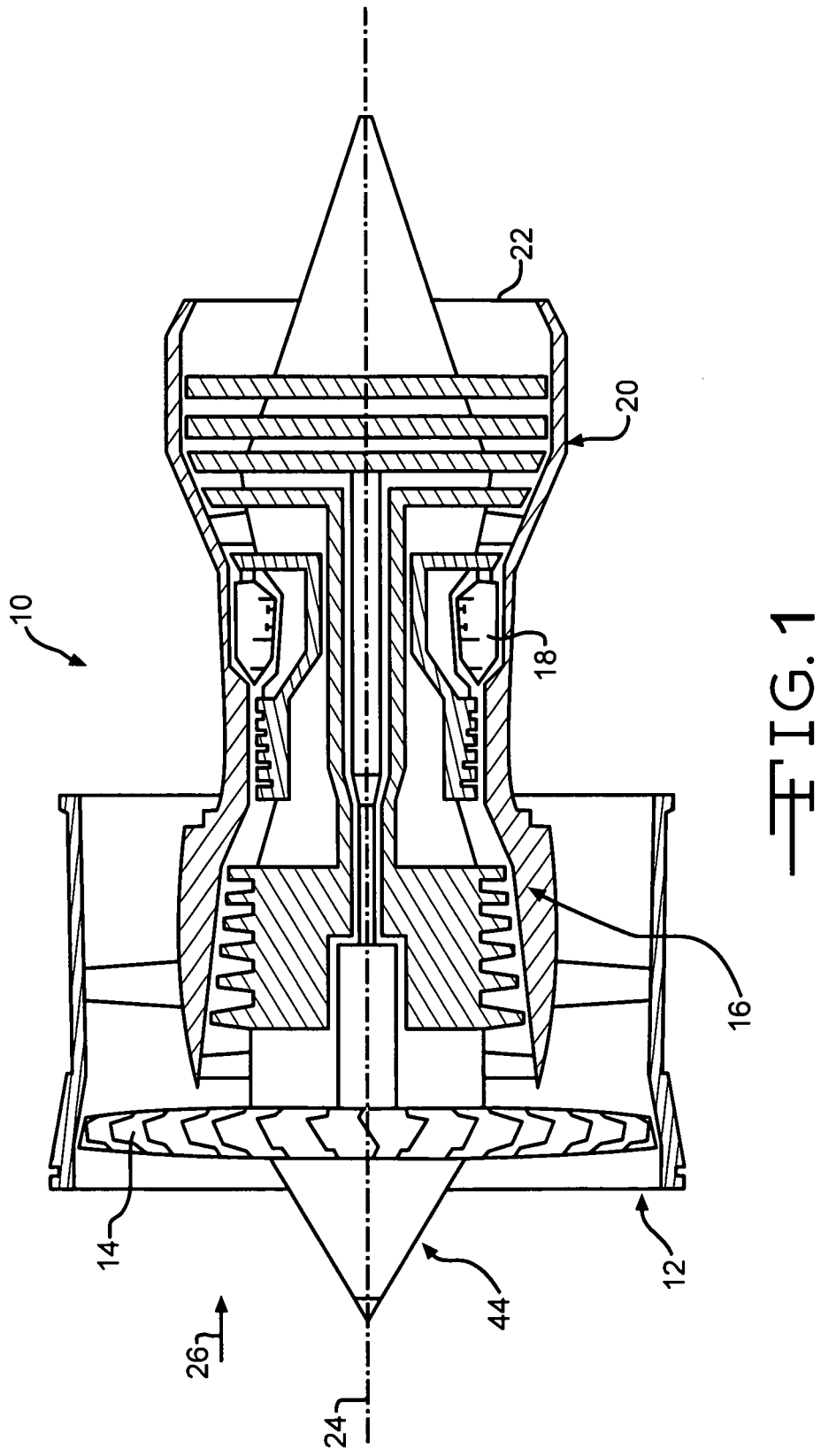
FIG. 1 is a cross-section of a turbine engine according to an embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as shown by the exemplary embodiment, provides a nose cone assembly for a turbine engine. The inventive nose cone assembly can be mounted to the turbine engine through mounting apertures that are accessible through the forward end of a spinner body of the nose cone assembly. This provides several benefits in the exemplary embodiment of the invention. First, the outer surface of the spinner body can be continuous, unbroken by apertures for accessing mounting apertures. Air flow into the turbine engine will be more stable and aerodynamic efficiency will be improved. In the exemplary embodiment of the invention, the outer surfaces of the spinner body and the disk or blisk of a fan (described in greater detail below) can be free of discontinuities associated with mounting hardware between a forward-most end of the spinner body and an aft end of the disk or blisk, 360° about a centerline axis of the turbine engine. Second, eliminating separate access holes around the periphery of the spinner body eliminates internal and external features where stress concentrations can develop. The spinner body can thus be designed thinner and lighter. Third, the smooth profile of the spinner body is easier to manufacture than a profile having access apertures. Fourth, the exemplary embodiment can reduce the likelihood of foreign object damage by reducing the possible sources of foreign objects. In the exemplary embodiment of the invention, a nose cone assembly and a fan can be connected to one another through structures (described in greater detail below) that are disposed radially inward of outer surfaces of the spinner body and the hub. Thus, these structures are prevented from entering a fluid flow path across the blades of the fan in the event of destructive separation from either the nose cone assembly or the fan.

It is noted that any benefits articulated herein may not be realized in all operating environments for all embodiments of the invention. Furthermore, it is noted that the benefits articulated herein are not exhaustive, other benefits may be perceived in the practice of the exemplary embodiment or in the practice of alternative embodiments of the invention. The benefits associated with the exemplary embodiments and described herein are not limitations of the broader invention, but rather demonstrate industrial applicability of the invention through the exemplary embodiments.

Referring to FIG. 1, a turbine engine 10 can include an inlet 12 and a fan 14. The exemplary fan 14 is a blisk, a disk structure integrally formed with a plurality of blades. The turbine engine can also include a compressor section 16, a combustor section 18, and a turbine section 20. The turbine engine 10 can also include an exhaust section 22. The fan 14, compressor section 16, and turbine section 20 are all arranged to rotate about a centerline axis 24. Fluid such as air can be drawn into the turbine engine 10 as indicated by the arrow referenced at 26. The fan 14 directs fluid to the compressor section 16 where it is compressed. The compressed fluid is mixed with fuel and ignited in the combustor section 18. Combustion gases exit the combustor section 18 and flow through the turbine section 20. Energy is extracted from the combustion gases in the turbine section 20.

Figure 2:
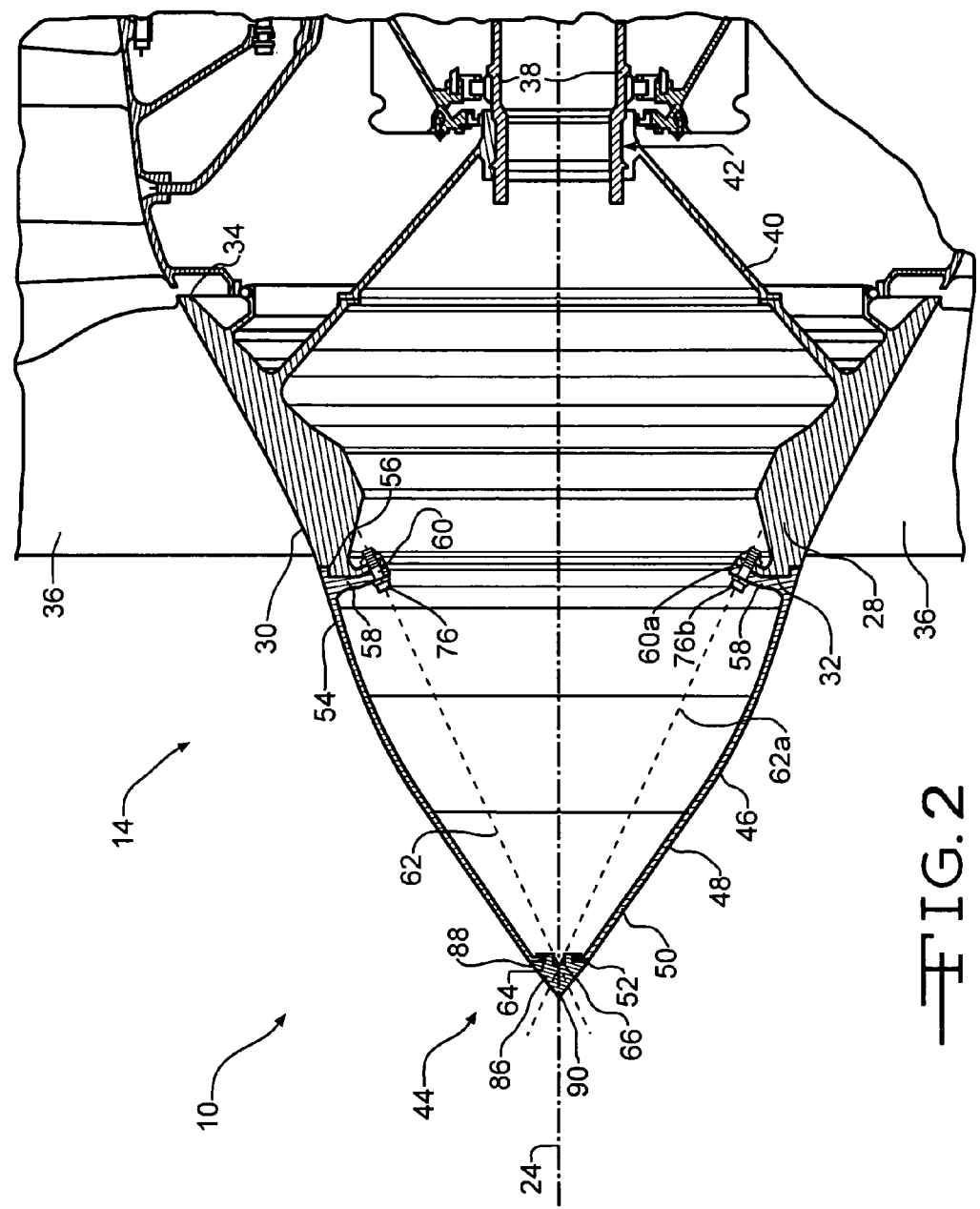
FIG. 2 is a magnified portion of FIG. 1 focusing on the nose cone assembly.

Referring now to FIG. 2, the fan 14 includes a hub 28 having an outer surface 30 and a plurality of blades 36 integrally formed with the hub 28. The exemplary fan 14 can be referred to in the art as a "blisk." As set forth below in a second embodiment of the invention, a fan 14a (shown in FIG. 5) is an assembly of structures and can be referred as a "bladed disk" in the art. The hub 28 can extend between a forward end 32 and an aft end 34. The terms forward or upstream and downstream or aft are used with respect to the general direction of the working fluid flow through the turbine engine 10.

The blisk 14 can be attached to a shaft 38 of the turbine engine 10. The shaft 38 can be the low pressure shaft and can drive the blisk 14 in rotation to provide a flow of air through the inlet 12 (shown in FIG. 1). In the exemplary embodiment of the invention, the blisk 14 can be connect to the shaft 38 through a cone drive 40, which is engaged to the shaft 38 through splines 42.

A nose cone assembly 44 can be attached to the hub 28. The nose cone assembly 44 includes a spinner body 46 having an outer surface 48 and extending axially (along the axis 24) between an upstream portion 50 generally tapering to a truncated first end 52 and a base portion 54 at a second end 56. The exemplary base portion 54 can be generally cylindrical. The spinner body 46 can have a generally conical/ogive shape centered on the axis 24. The term "generally cylindrical" is relative and can refer to a true cylindrical profile or a profile that tapers more gradually than the tapering at the upstream portion 50. The spinner body 46 can be formed from any material or combination of materials appropriate in view of the operating environment of the turbine engine 10.

The outer surface 48 of the spinner body 46 can be substantially continuous between the first end 52 and the second end 56. The outer surface 48 can be without apertures or other discontinuities caused by structures associated with accessing hardware for mounting the nose cone assembly 44 to the hub 28. The degree or rate of tapering can vary between the first and second ends 52, 56.

The nose cone assembly 44 also includes a flange 58 positioned radially inward of the outer surface 48. The flange 58 is adjacent to the generally cylindrical base portion 54. The flange 58 can extend radially inward relative to the spinner body 46 and/or extend axially relative to the spinner body 46. In the exemplary embodiment, the flange 58 can extend both radially and axially relative to the spinner body 46. Also, in the exemplary embodiment, the spinner body 46 and the flange 58 can be integrally formed with respect one another. However, in alternative embodiments of the invention, the spinner body 46 and the flange 58 can be separately formed with respect one another and be removably or permanently fixed together.

The nose cone assembly 44 also includes a plurality of first apertures, such as first apertures 60, 60a, defined in the flange 58 for removably connecting the spinner body 46 to the blisk 14. Embodiments of the invention can include any number of first apertures appropriate in view of the operating environment of the turbine engine 10. Each of the plurality of first apertures 60, 60a can extend along an individual first aperture axes 62, 62a. The axes 62, 62a, respectively, are the central axes of the first apertures 60, 60a.

The nose cone assembly 44 also includes a second aperture 64 defined in the spinner body 46. All of the plurality of first apertures 60, 60a can be accessed through the second aperture 64 for attaching or removing the nose cone assembly 44 from the blisk 14. The exemplary second aperture 64 can be positioned at the truncated first end 52.

The axes 62, 62a of the first apertures 60, 60a, respectively, can intersect at a point proximate to the second aperture 64.

The exemplary axes 62, 62a can intersect at a point referenced at 66 in the second aperture 64, as shown in FIG. 2. This "straight line" arrangement can ease assembly of the nose cone assembly 44 with the blisk 14. In alternative embodiments of the invention, all of the axes 62, 62a may not intersect or may intersect at point forward or aft of the point referenced at 66. Furthermore, the intersection point may or may not be on the axis 24.

Figure 3:
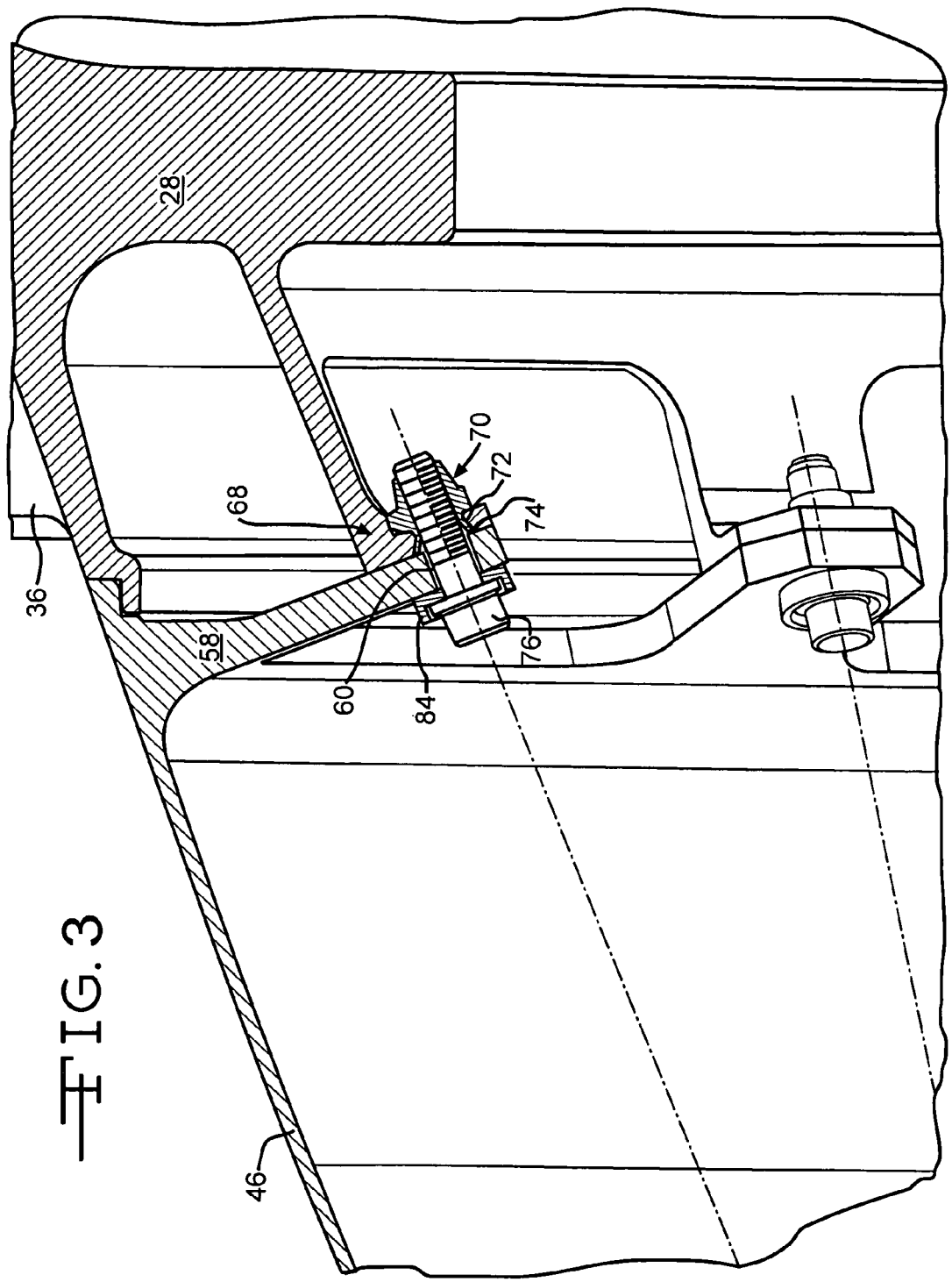
FIG. 3 is a perspective view of the turbine engine cross-section in which the cross-section through the connecting structure is magnified.

The exemplary nose cone assembly 44 can be assembled to the turbine engine 10 by aligning each of the plurality of first apertures defined in the flange 58, including first apertures 60 and 60a, with a corresponding aperture defined in the blade hub 28 (a "third" aperture). FIG. 3 shows a magnified view of the assembly at each first aperture. The first aperture 60 can be aligned with an aperture 68 defined in the blade hub 28. The aperture 68 can be threaded. In the exemplary embodiment, the aperture 68 can be defined by a nut 70 swaged to the hub 28. The nut 70 includes a tail portion 72 received in an aperture 74 defined by the hub 28. The cooperation between the tail portion 72 and the aperture 74 prevents the nut 70 from moving relative to the hub 28. In an alternative embodiment of the invention, a plurality of nuts can be fixed to a nut plate and the nut plate can be fixed to the hub 28.

Figure 4:
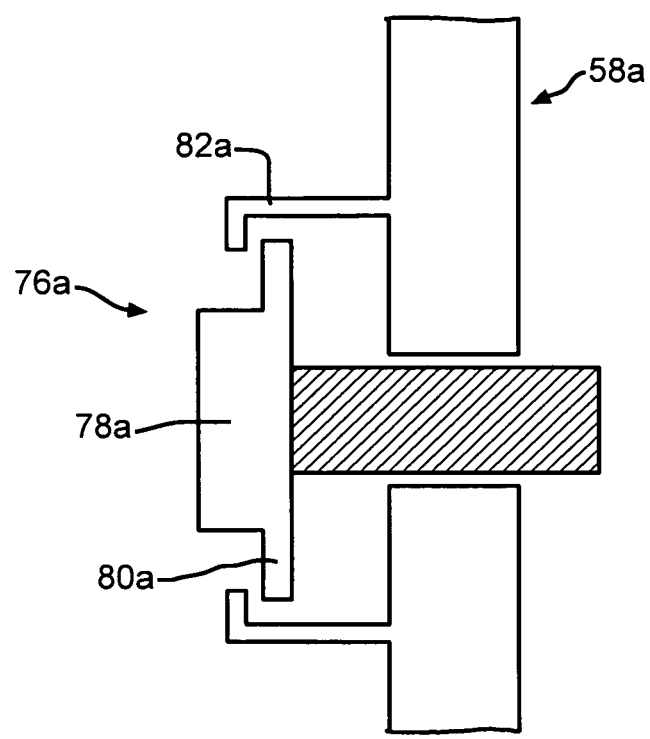
FIG. 4 is a cross-section of an alternative retaining arrangement for nose cone fasteners.

In a second assembly step, a first fastening member 76 can be positioned adjacent to one of the first apertures. The first fastening member 76 can be a bolt and FIG. 3 shows the bolt inserted in both the first aperture 60 and the third aperture 68. In alternative embodiments of the invention, one or more of the fastening members 76 can be mounted on the flange 58 for limited movement relative to the spinner body 46. In other words, a fastening member 76 can be permanently and loosely attached to the flange 58 or the hub 28. FIG. 4 shows a fastening member 76a as a bolt captured relative to the flange 58a. A head 78a of the bolt 76a can be accessed by a rotary tool to rotate the bolt 76a relative to the flange 58a. The bolt 76a can also move along its central axis relative to the flange 58a. However, a flange portion 80a of the bolt 76a cooperates with a projection 82a of the flange 58a to prevent the bolt 76a from fully separating from the flange 58a.

As shown in the drawings, if either of the fastening members 72, 72a detach or destructively disconnect from the remaining structures, they will not enter the fluid flow path across the blades 36. In such an event, the fastening members 72, 72a would be prevented from entering the flow path by the spinner body 46. These fastening members could be retained within the spinner body 46 until maintenance is performed.

Referring again to FIG. 2, a rotary tool can be inserted through the second aperture 64 in a third assembly step. The rotary tool (not shown) can include a socket or any other structure operable to engage the fastening members, such as fastening members 76 and 76b, to turn the fastening member. After a first fastening member 76 is tightened to a desired level of torque by the rotary tool, a second fastening member 76b that is spaced from the first fastening member 76 can be engaged with the rotary tool. The second fastening member 76b can be engaged by the rotary tool without removing the rotary tool from the second aperture 64.

After all of the fastening members have been tightened, a trim balance operation can be completed through the second aperture 64. In a trim balance operation, the hub 28 and nose cone assembly 44 can be rotated and any imbalance or eccentricity in the assembled structure can be addressed. For example, one or more of the fastening members can be removed and a balance weight can be added to correct imbalance in the assembled structure. FIG. 3 shows a balance weight 84 encircling the fastening member 76. The fastening member 76 can be inserted through a center aperture in the balance weight 84 and then reinserted in the apertures 60 and 68. Another step that can be applied, instead of or in addition to the addition of balance weights, is that the spinner can be rotated to help the imbalance. Both steps can be potential solutions for imbalance.

Referring again to FIG. 2, after the trim balance operation, a spinner tip 86 can be inserted in the second aperture 64. The spinner tip 86 can be removably received in the second aperture 64. The spinner tip 86 can be a unitary structure, integrally formed. The spinner tip 86 can be formed from elastomeric material. The spinner tip 86 can be engaged with the second aperture 64 through a "snap-fit" connection whereby the spinner tip 86 is partially deformed during assembly and fully or partially returns to its original shape after insertion in the second aperture 64. There is not an equation to determine the maximum size for an elastomeric spinner tip. Generally, the spinner tip can be about one-fifth to about one-tenth the size of the base of the spinner body. As a result, the size of the exemplary second aperture 64 can be large enough to allow access to the first apertures, but small enough to accommodate the maximum desirable size of the spinner tip 86.

After full assembly, an outer surface 88 of the spinner tip and the outer surface 48 of the spinner body 46 can be substantially continuous 360° about said centerline axis. In other words, the outer surfaces 88 and 48 can be flush with one another at the intersection of the spinner tip 86 and the spinner body 46. Similarly, the outer surface 48 of the spinner body 46 and the outer surface 30 of the hub 28 can be substantially continuous with one another 360° about the centerline axis. Thus, a substantially continuous surface can be defined from an apex 90 of the spinner tip 86 to the aft end 34 of the hub 28 to promote steady air flow into the turbine engine 10.

Figure 5:
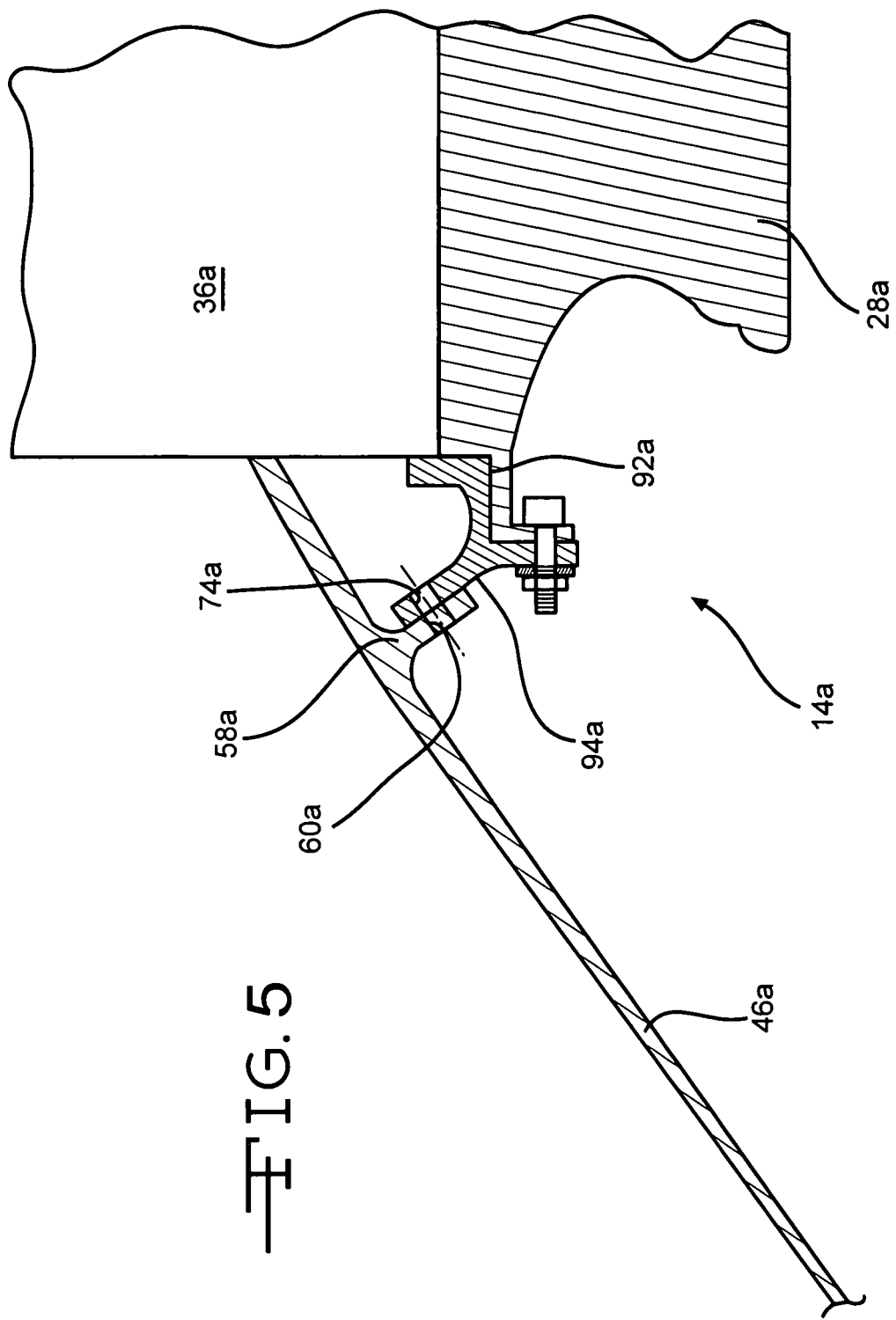
FIG. 5 is view similar to FIG. 3 but of an alternative embodiment of the invention.

FIG. 5 shows an alternative embodiment of the invention. The second exemplary fan 14a can be an assembly of a hub or disk 28a and a plurality of blades 36a that are removably attached to the disk 28a, rather than an integral structure. The blades 36a can be held in place with a retainer 92a, which can also be viewed as part of the fan 14a. A circumferential flange 58a of the spinner body 46a can extend radially inward and axially to overlap a circumferential flange portion 94a of the retainer 92a. A plurality of apertures, such as aperture 60a, can be defined in the flange 58a. A plurality of apertures, such as aperture 74a, can be defined in the circumferential flange portion 94a. The apertures 60a can align with apertures 74a to receive fastening members (not shown) for attaching the spinner body 46a to the disk 28a, through the retainer 92a.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A nose cone assembly for a gas turbine engine comprising:
    a spinner body having an outer surface and extending axially between an upstream portion generally tapering to a truncated first end and a base portion generally cylindrical in cross-section at a second end;
    a flange positioned radially inward of said outer surface and axially adjacent to said base portion;
    a plurality of first apertures defined in said flange for removably connecting said spinner body to a fan of a gas turbine engine; and
    a second aperture defined in said spinner body through which all of said plurality of first apertures can be accessed for attaching or removing said nose cone assembly from the fan, wherein the second aperture forms a tip opening of the spinner body,
    wherein a central axis of one of the plurality of first apertures extends in an unimpeded direction through the second aperture such that the central axis does not cross a supporting structure of the spinner body.

2. The nose cone assembly of claim 1 wherein said second aperture is positioned at said truncated first end.

3. The nose cone assembly of claim 1 further comprising:
    a spinner tip removably received in said second.

4. The nose cone assembly of claim 3 wherein said spinner tip is integrally formed of elastomeric material and is snap fit into the second aperture.

5. The nose cone assembly of claim 1 wherein each of said plurality of first apertures extends along a respective first aperture axis and wherein all of said first aperture axes intersect at a point proximate to said second aperture.

6. The nose cone assembly of claim 1 wherein each of said plurality of first apertures extends along a respective first aperture axis and wherein all of said first aperture axes intersect at a point in said second aperture.

7. The nose cone assembly of claim 1 wherein said spinner body is further defined as having a substantially continuous ogive outer surface between said second end and said second aperture.

8. The nose cone assembly of claim 1 further comprising:
    a plurality of fastening members mounted on said flange for limited movement relative to said flange.

9. The nose cone assembly of claim 8 wherein said plurality of fastening members are further defined as bolts captured relative to the flange.

10. The nose cone assembly of claim 1 wherein said spinner body and said flange are integrally formed with respect one another.

11. The nose cone assembly of claim 1 wherein said flange is further defined as extending radially inward relative to said spinner body.

12. The nose cone assembly of claim 1 wherein said flange is further defined as extending axially relative to said spinner body.

13. A method of assembling a nose cone assembly to a turbine engine comprising:
    providing the spinner body, flange, plurality of first apertures, and second aperture of the nose cone assembly of claim 1;
    aligning each of the plurality of first apertures defined in the flange of the nose cone assembly with a corresponding aperture defined in one of a blisk and a blade retainer of a turbine engine;
    positioning a first fastener adjacent to one of the first apertures;
    inserting a rotary tool through the second aperture at a tip of the nose cone assembly;
    rotating the first fastener with the rotary tool;
    positioning a second fastener adjacent to another one of the first apertures; and
    moving the rotary tool to engage the second fastener without removing the tool from the second aperture.

14. The method of claim 13 further comprising the steps of:
    removing the rotary tool from the second aperture after said moving step; and inserting an elastomeric spinner tip in the second aperture after said removing step.

15. The method of claim 14 further comprising the step of:

completing a trim balance operation through the second aperture after said removing step and before said inserting step;

wherein the inserting includes snap fitting the elastomeric spinner tip in the second aperture.

\* \* \* \* \*